United States Patent [19]

Fukumura et al.

[11] Patent Number: 4,549,270
[45] Date of Patent: Oct. 22, 1985

[54] METHOD OF CONTROLLING SELECTION OF TOOLS IN A QUADRIAXIAL NUMERICAL CONTROL LATHE

[75] Inventors: Naoe Fukumura; Shunji Hasegawa, both of Nagoya; Masanobu Tanaka, Iwakura, all of Japan

[73] Assignee: Yamazaki Machinery Works, Ltd., Niwa, Japan

[21] Appl. No.: 472,253

[22] Filed: Mar. 4, 1983

[30] Foreign Application Priority Data

Mar. 11, 1982 [JP] Japan .................................. 57-39212

[51] Int. Cl.$^4$ ........................ G05B 19/00; G06F 11/00
[52] U.S. Cl. .................................... 364/474; 364/191; 29/568; 82/2 B
[58] Field of Search ............... 364/171, 191, 192, 474, 364/475; 318/572; 29/568; 82/2 B

[56] References Cited

U.S. PATENT DOCUMENTS

| | | | |
|---|---|---|---|
| 4,092,720 | 5/1978 | Carey | 82/2 B |
| 4,424,569 | 1/1984 | Imazeki et al. | 364/167 X |
| 4,443,929 | 4/1984 | Bayer et al. | 29/568 |

Primary Examiner—Jerry Smith
Assistant Examiner—Allen MacDonald
Attorney, Agent, or Firm—Cushman, Darby and Cushman

[57] ABSTRACT

A method of controlling selection of tools in a quadriaxial numerical control lathe provided with two tool rests each mounting a plurality of tools and adapted to perform machining by the use of the tool rests, without requiring a programmer or the like to give an instruction concerning selection of tools to be used in each of machining processes when he/she forms a machining program. The method comprises: providing a tool kind memory storing a tool kind table showing the kinds of tools to be used in accordance with machined portions and machining modes, and a tool information memory storing a tool data such as the kinds of the tools mounted on the tool rests, the positions of the tools on the tool rests, identification of the tool rests and so force; retrieving the content of the tool kind table in the tool kind memory in accordance with the machining modes and the machined portions for each of machining processes in order to determine the kinds of the tools to be used in each machining process; and further retrieving the tool data in the tool information memory on the basis of the kinds of the tools thus determined, thereby to select and extract the tools usable in each machining process.

16 Claims, 4 Drawing Figures

Fig. 2

| MACHINING MODE \ TOOL KIND | MACHINED PORTION | | | |
|---|---|---|---|---|
| | OUTER PERIPHERY | INNER PERIPHERY | END SURFACE | — |
| ROD | (T1) | (T4) | — | — |
| PROFILE | (T1) TG | (T4) TG | — | — |
| CHAMFER | | | (T7) | — |
| END SURFACE | — | — | (T10) | — |
| THREAD | (T2) | (T5) | (T8) | — |
| GROOVE | (T3) | (T6) | (T9) | — |
| DRILL | — | — | — | (T11) TG |
| SINGLE ACTION | — | — | — | (T12) TG |

Fig. 3

| | MACHINING DIRECTION | | | |
|---|---|---|---|---|
| | ← | | → | |
| TOOL CHARACTER | RIGHT HAND | LEFT HAND | RIGHT HAND | LEFT HAND |
| SPINDLE ROTATIONAL DIRECTION | FORWARD | REVERSE | REVERSE | FORWARD |
| | 19 | 19 | 19 | 19 |

METHOD OF CONTROLLING SELECTION OF TOOLS IN A QUADRIAXIAL NUMERICAL CONTROL LATHE

BACKGROUND OF THE INVENTION

The present invention relates to a method of controlling selection of tools in a quadriaxial numerical control lathe with two tool rests.

In a quadriaxial numerical control lathe in which two tool rests are individually controlled for machining, there has been a steady increase in number of kinds of tools usable for machining, so that the degree of freedom in machining increases, and on the other hand, it becomes necessary to determine and select tools suitable for machined portions and machining modes.

Hitherto, such determination has been made by a programmer in forming a machining program. However, the programmer is required to have a high level of knowledge and skill to comprehend characteristics of each of a large number of tools mounted on the tool rests and select tools suitable for each machining, and it takes much labor and time to form a machining program. Consequently, in a large variety-small lot machining operation, the advantage of the quadriaxial numerical control lathe in reducing machining time is undesirably canceled out by the increase in time to form a machining program.

SUMMARY OF THE INVENTION

Accordingly, it is a primary object of the invention to provide a method of controlling selection of tools in a quadriaxial numerical control lathe without requiring a programmer or the like to give an instruction concerning selection of tools, thereby overcoming the above-mentioned problem of the prior art.

To this end, according to the invention, there is provided a method of controlling selection of tools in a quadriaxial numerical control lathe comprising: providing a tool kind memory storing a tool kind table showing the kinds of tools to be used in accordance with machined portions and machining modes, and a tool information memory storing tool data such as the kinds of the tools mounted on the tool rests, the positions of the tools on the tool rests, identification of the tool rests and so forth; retrieving the content of the tool kind table in the tool kind memory in accordance with machining modes and machined portions for each of machining processes in order to determine the kinds of the tools to be used in each machining process; and further retrieving the tool data in the tool information memory on the basis of the kinds of the tools thus determined, thereby to select and extract the tools usuable in each machining process.

The above and other objects, features and advantages of the invention will become clear from the following description of the preferred embodiment taken in conjunction with the accompanying drawings.

BRIEF DESCRIPTION OF THE DRAWINGS

FIG. 2 is a schematic illustration of the content of a tool kind memory;

FIG. 3 is a schematic illustration of the content of a use condition memory.

DESCRIPTION OF THE PREFERRED EMBODIMENT

A preferred embodiment of the invention will be described hereinunder with reference to the accompanying drawings.

Figure 1:
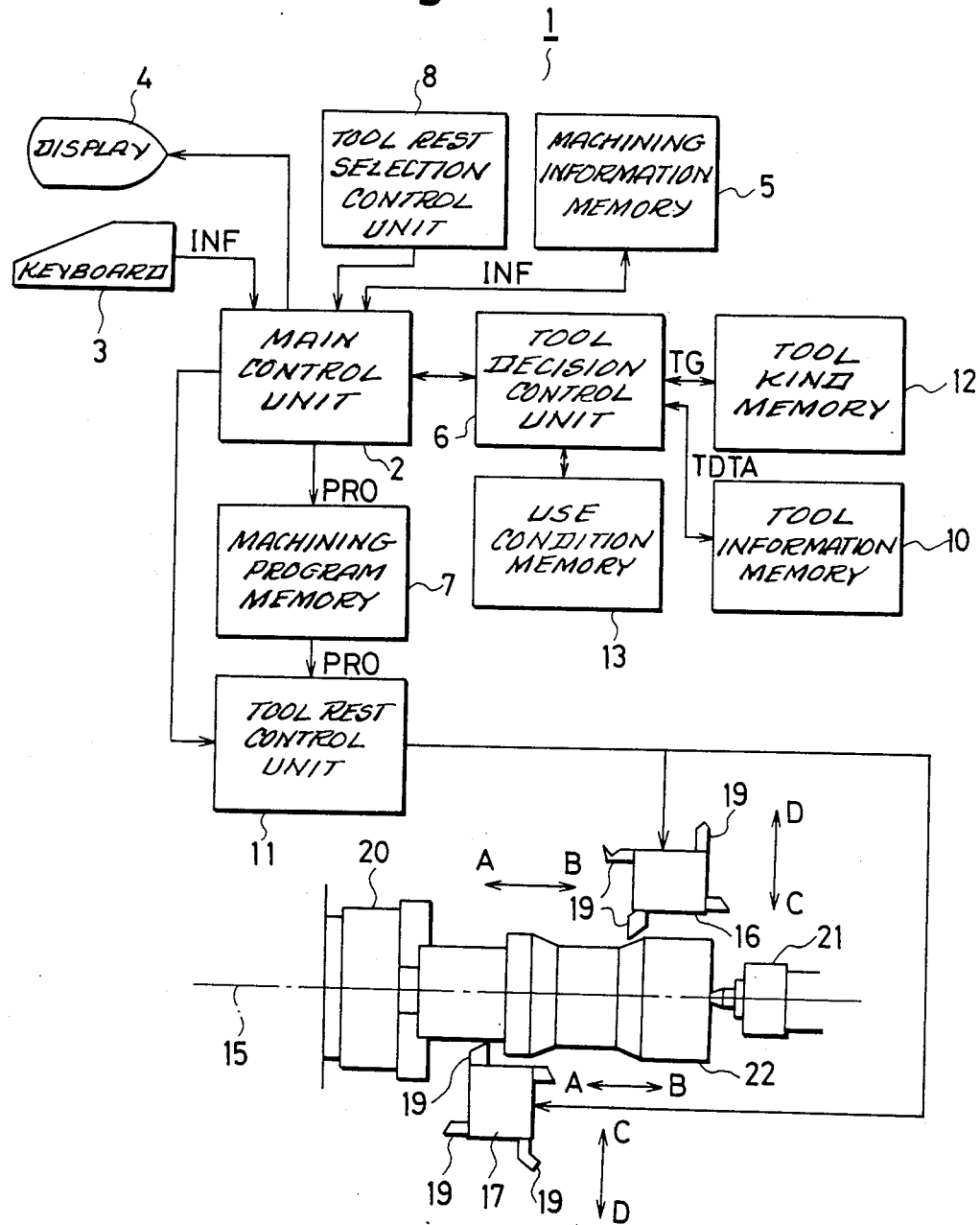
FIG. 1 is a control block diagram of an example of quadriaxial numerical control lathes to which the present invention is applied.

As will be seen from FIG. 1, a quadriaxial numerical control lathe 1 has a main control unit 2, to which connected are a keyboard 3, dispaly 4, a tool rest selection control unit 8, a machining information memory 5, a tool decision control unit 6 and a machining program memory 7. Connected to the tool decision control unit 6 are a tool kind memory 12, tool information memory 10 and a use condition memory 13. To the machining program memory 7 is connected a tool rest control unit 11 connected to the main control unit 2. The tool rest control unit 11 can control the drive of each of tool rests 16, 17 which are disposed opposite to each other on both sides of a spindle 15, respectively, and are adapted to be driven movably in the directions indicated by arrows A, B and C, D independently of each other. Each of the tool rests 16, 17 is equipped with a plurality of tools 19. The tools 19 can be selected and used at will by rotating the tool rests 16, 17. In addition, a workpiece 22 to be machined is supported between a chuck 20 and a tail stock 21.

Figure 4:
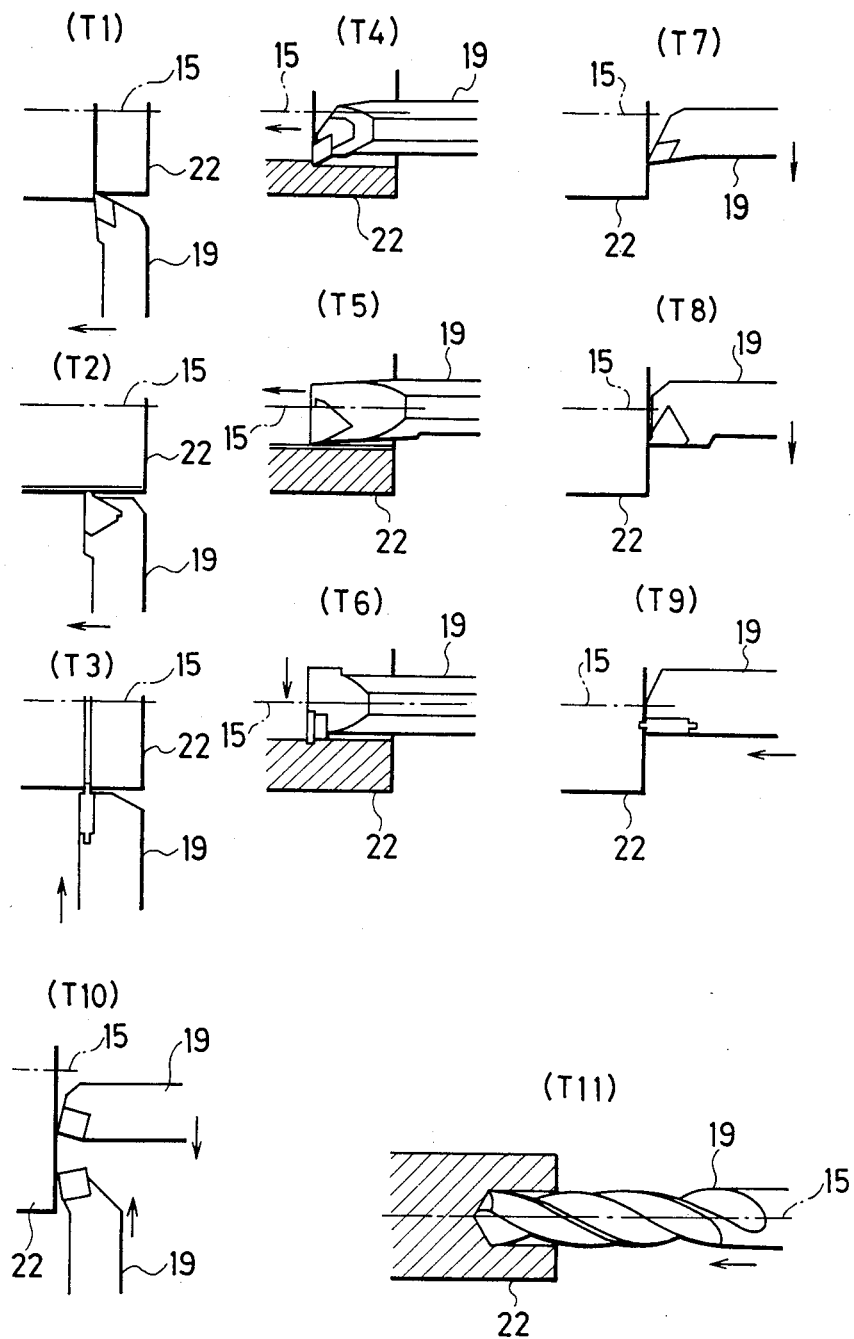
FIG. 4 is an illustration of various kinds of tools.

Since the quadriaxial numerical control lathe 1 has the described construction, in case of performing a machining operation by employing the lathe 1, the operator carries out the following procedure. First of all, according to a final shape of the workpiece such as shown in a drawing, the operator successively inputs, through the keyboard 3, machining information INF required to obtain the final shape through the main control unit 2 to the machining information memory 5 for each machining process (a series of machining units performed continuously in time by means of identical tools). The machining information INF includes an instruction concerning which one of machined portions CA in the outer periphery, inner periphery and end surface of the work 22 should be machined, for each machining process as well as an instruction as to the pattern of the movement of a tool at the machined portion CA, as one of machining modes MODE. As shown in FIG. 2, the machining modes MODE are classified into "rod" machining mode in which a tool is moved in parallel with the spindle, "profiling" mode in which a tool is moved in parallel along a final shape, "chamfering" mode for cutting portions uncut owing to the end cutting edge angle, "end surface" machining mode for cutting an end surface, "threading" mode for cutting a thread, "groving" mode for forming a groove, "drilling" mode for boring by means of a drill, "single action" machining mode in which a tool is manually set. The operator selects and inputs a machining mode MODE suitable for the machining of the machined portion on the basis of the final shape shown in the drawing. Moreover, the operator inputs as machining information INF as to whether the machining is rough machining or finish machining, the machining directions, the minimum inside diameter of the stock and so forth for each machining process. Thus, the final shape is decomposed into a plurality of machined portions CA and machining modes MODE and the like, and these are stored through the main control unit 2 into the machining information memory 5, as the machining information INF for each machining process. On the other hand, the main control unit 2 delivers the stored machining information INF to the tool decision control unit 6, which retrieves the content of the tool kind memory 12 and determines the kinds TG of the tools to be used in the machining according to the machining modes MODE and the machined portions CA for each machining process. In other words, as shown in FIG. 2, the tool kind memory 12 previously stores a tool kind table TTBL showing the machining modes MODE and the machined portions CA as parameters. Thereby, when machining modes MODE and machined portions CA become clear, the kinds TG of the tools to be used in the machining are immediately determined from the table TTBL. As the kinds TG of tools, there are prepared eleven kinds, from (T1) to (T11) as shown in FIG. 4, including the positions and moving directions (indicated by arrows in the Figure) of the tools with respect to the work 22. In addition, there is provided, as another kind (T12), one corresponding to the "single action" machining mode in which the operator manually appoints a tool. After the kinds TG of the tools to be used are thus determined, the control unit 6 retrieves the content of the tool information memory 10 in order to extract tools suitable for the determined kinds TG. The tool information memory 10 previously stores tool data TDTA such as the kinds TG of all the tools 19 mounted on the tool rests 16, 17, whether each of the tools is for rough machining or finish machining, the character of each of the tools, which is the starting direction of cutting when the top face of tool is mounted upward and the rotational direction of the spindle is forward in a center lathe with single tool rest, how the tools are mounted on the tool rests, the positions of the tools on the tool rests, identification of the tools rests, the end cutting edge angle, the minimum machining diameter (in case of a boring tool) and so forth. Accordingly, the control unit 6 selects and extracts usable tools in accordance with the tool kinds TG and the finishing extent data and the minimum inside diameter data of stock in the machining information INF. After the usable tools are thus selected and extracted, the control unit 6 refers the tool data TDTA of the extracted tools to those in a use condition table UTBL stored in the use condition memory 13 in order to know whether the combinations of the character of each of the tools, how the tools are mounted on the tool rests, the machining directions and the rotational directions of the spindle 15 satisfy the conditions shown in table UTBL. As shown in FIG. 3, the table UTBL shows combinations of the character of each of the tools and the rotational directions of the spindle corresponding to the machining directions (indicated by arrows in the Figure). Only the tools satisfying these conditions are determined as the tools to be used. After the tools are determined, the control unit 6 informs, through the main control unit 2, the tool rest selection control unit 8 of the names of the tools to be used in the machining, the tool rests mounting these tools and the positions thereof on the tool rests. On the basis of the information, the control unit 8 determines the tools to be used for each machining process, together with the tool rests mounting the tools concerned, respectively. Upon the completion of determination of the tools to be used for each machining process, the main control unit 2 stores in the machining program memory 7 the machining processes allotted to each of the tool rests, together with the names of the tools to be used and various cutting conditions, thereby forming a machining program PRO. Upon the completion of the machining program PRO, the main control unit 2 drives the tool rest control unit 11 as well as rotates the chuck 20 together with the workpiece 22. Thereupon, the tool rest control unit 11 reads out the machining program PRO from the memory 7 and rotates the tools rests 16, 17 in order to select the tools 19 appointed in the program PRO and then moves the tool rests 16, 17 in the directions indicated by the arrows A, B and C, D, thereby carrying out machining.

As will be apparent from the foregoing description, the method of the invention comprises: providing the tool kind memory 12 storing the tool kind table TTBL showing the kinds TG of the tools to be used in accordance with the machined portions CA and the machining modes MODE, and the tool information memory 10 storing the tool data TDTA such as the kinds TG of the tools 19 mounted on the tool rests 16, 17, the positions of the tools on the tool rests, identification of the tool rests and so forth; retrieving the content of the tool kind table TTBL in accordance with the machining modes MODE and the machined portions CA for each machining process in order to determine the kinds TG of the tools to be used in the machining; and further retrieving the content of the tool data TDTA on the basis of the thus determined kinds TG, thereby to select and extract the tools 19 usable in the machining. Therefore, it becomes unnecessary for the operator or programmer to instruct the lathe 1 to select the tools 19 to be used in each machining while carefully considering the characteristics of the tools 19. Accordingly, it becomes possible not only to readily form the machining program PRO in an extremely short period of time but also to efficiently perform even a large variety-small lot machining operation.

Although the invention has been described through specific terms, it is to be noted here that the described embodiment is only illustrative and various changes and modifications may be imparted thereto without departing from the scope of the invention which is limited solely by the appended claims.

What is claimed is:

1. A method of controlling selection of tools in a quadriaxial numerical control lathe provided with two tool rests each mounting a plurality of tools and adapted to perform machining by the use of said tool rests, comprising the steps of:

storing in a tool kind memory a tool kind table including kinds of tools and corresponding machined portions and machining modes, and storing in a tool information memory tool data including kinds of tools mounted on said tool rests, the positions of said tools on said tool rests, and identification of said tool rests;

retrieving the content of said tool kind table in response to a determined machining mode and said machined portions for each machining process in order to determine the kinds of tools used in each machining process;

retrieving said tool data from said tool information memory in response to the kinds of the tools thus determined; and selecting and extracting the tools usable in each machining process based on the retrieved tool data.

2. A method according to claim 1, wherein said step of providing a tool kind memory comprises the step of providing a tool kind memory wherein said machined portions are classified into at least three portions: outer periphery, inner periphery and end surface.

3. A method according to claim 2, wherein said step of providing a tool kind memory comprises the step of providing a tool kind memory wherein said machining modes are classified into at least seven such modes: a rod maching mode, profiling mode, chamfering mode, end surface machining mode, threading mode, grooving mode and drilling mode.

4. A method according to claim 3, further comprising the steps of providing a use condition memory storing a use condition table including conditions of combination between the character of each of said tools and rotational directions of a spindle corresponding to machining directions;
   selecting and extracting tools through retrieval of said tool data in said tool information memory;
   determining whether or not the extracted tools satisfy said conditions specified in said use condition table; and
   using only the tools satisfying said conditions in the machining.

5. A method according to claim 2, further comprising the steps of providing a use condition memory storing a use condition table including conditions of combination between the character of each of said tools and rotational directions of a spindle corresponding to machining directions;
   selecting and extracting tools through retrieval of said tool data from said tool information memory;
   determining whether or not the extracted tools satisfy said conditions specified in said use condition table; and
   using only the tools satisfying said conditions in the machining.

6. A method according to claim 1, wherein said step of providing a tool kind memory comprises the step of providing a tool kind memory wherein said machining modes are classified into at least seven such modes: a rod maching mode, profiling mode, chamfering mode, end surface machining mode, threading mode, grooving mode and drilling mode.

7. A method according to claim 6, further comprising the steps of providing a use condition memory storing a use condition table including conditions of combination between the character of each of said tools and rotational directions of a spindle corresponding to machining directions;
   selecting and extracting tools through retrieval of said tool data from said tool information memory;
   determining whether or not the extracted tools satisfy said conditions specified in said use condition table; and
   using only the tools satisfying said conditions in the machining.

8. A method according to claim 1, further comprising the steps of providing a use condition memory storing a use condition table including conditions of combination between the character of each of said tools and rotational directions of a spindle corresponding to machining directions;
   selecting and extracting tools through retrieval of said tool data from said tool information memory;
   determining whether or not the extracted tools satisfy said conditions specified in said use condition table; and
   using only the tools satisfying said conditions in the machining.

9. A quadriaxial numerical control lathe comprising:
   two (2) tool rests each having mounted thereon a plurality of tools for performing machining;
   a tool kind memory for storing a tool kind table including kinds of tools and corresponding machined portions and machining modes;
   a tool information memory for storing tool data including kinds of tools mounted on said tool rests, the positions of said tools on said tool rests and identification of said tool rests;
   means for retrieving the contents of said tool kind table in said tool kind memory in response to a determined machining mode and machined portions for each machining process in order to determine the kinds of tools used in each machining process; and
   means for retrieving tool data from said tool information memory in response to the kinds of tools thus determined and controlling said tool rests in accordance therewith so that the appropriate tool of said plurality of tools is properly used for each machining process.

10. A numerical control lathe according to claim 9 wherein said machined portions stored in said tool kind table are classified into at least three portions: outer periphery, inner periphery and end surface.

11. A numerical control lathe according to claim 10 wherein said machining modes stored in tool kind memory are classified into seven such modes including: a rod machining mode, profiling mode, chamfering mode, end surface machining mode, threading mode, grooving mode and drilling mode.

12. A numerical control lathe according to claim 11 further including:
   a use condition memory for storing a condition table including conditions of combination of a character of each of said tools and rotational directions of a spindle of said lathe corresponding to machining directions;
   means for selecting and extracting tools through retrieval of said tool data in said tool information memory; and
   means for determining whether or not the extracted tools satisfy said conditions specified in said use condition table and using only the tools satisfying said conditions.

13. A numerical control lathe according to claim 10 further including:
   a use condition memory for storing a condition table including conditions of combination of a character of each of said tools and rotational directions of a spindle of said lathe corresponding to machining directions; and
   means for determining whether or not the extracted tool data from said too information memory satisfy said conditions specified in said use condition table and using only the tools corresponding to tool data satisfying said conditions.

14. A numerical control lathe according to claim 9 wherein said machining modes stored in tool kind memory are classified into seven such modes including: a rod machining mode, profiling mode, chamfering mode, end surface machining mode, threading mode, grooving mode and drilling mode.

15. A numerical control lathe according to claim 14 further including:
   a use condition memory for storing a condition table including conditions of combination of a character of each of said tools and rotational directions of a spindle of said lathe corresponding to machining directions; and means for determining whether or not the extracted tool data from said tool information memory satisfy said conditions specified in said use condition table and using only the tools corresponding to tool data satisfying said conditions.

16. A numerical control lathe according to claim 9 further including:

a use condition memory for storing a condition table including conditions of combination of a character of each of said tools and rotational directions of a spindle of said lathe corresponding to maching directions; and means for determining whether or not the extracted tool data from said tool information memory satisfy said conditions specified in said use condition table and using only the tools corresponding to tool data satisfying said conditions.

* * * * *